United States Patent [19]

Petersen et al.

[11] Patent Number: 5,371,892
[45] Date of Patent: Dec. 6, 1994

[54] METHOD FOR CONFIGURING A COMPUTER BUS ADAPTER CIRCUIT BOARD WITHOUT THE USE OF JUMPERS OR SWITCHES

[75] Inventors: Brian A. Petersen, Los Altos; Richard S. Reid, Mountain View, both of Calif.

[73] Assignee: 3COM Corporation, Santa Clara, Calif.

[21] Appl. No.: 954,610

[22] Filed: Sep. 30, 1992

Related U.S. Application Data

[63] Continuation of Ser. No. 452,893, Dec. 19, 1989, abandoned.

[51] Int. Cl.$^5$ .............................................. G06F 12/00
[52] U.S. Cl. ..................................... 395/700; 395/650; 395/325; 364/DIG. 2
[58] Field of Search ............... 395/325, 575, 650, 275, 395/800, 700

[56] References Cited

U.S. PATENT DOCUMENTS

| | | | |
|---|---|---|---|
| 4,085,448 | 4/1978 | Kogge | 364/900 |
| 4,462,029 | 7/1984 | Neumann et al. | 340/825.5 |
| 4,571,676 | 2/1986 | Mantellina et al. | 364/200 |
| 4,710,893 | 12/1987 | McCutcheon et al. | 395/325 |
| 4,775,931 | 10/1988 | Dickie et al. | 364/200 |
| 4,870,704 | 9/1989 | Matelan et al. | 364/200 |
| 4,875,158 | 10/1989 | Ashkin et al. | 364/200 |
| 4,890,224 | 12/1989 | Fremont | 395/325 |
| 4,912,627 | 3/1990 | Ashkin et al. | 364/200 |
| 4,964,038 | 10/1990 | Louis et al. | 395/275 |
| 5,038,320 | 8/1991 | Heath et al. | 364/900 |
| 5,140,691 | 8/1992 | Austruy et al. | 395/575 |

Primary Examiner—Thomas G. Black
Assistant Examiner—Peter Y. Wang
Attorney, Agent, or Firm—Townsend and Townsend Khourie and Crew

[57] ABSTRACT

A computer bus adapter device which is coupled to a true parallel computer bus is automatically set to a predetermined configuration in response to configuration data provided to the bus by a host process. During a set-up portion of an initialization procedure, the adapter device recognizes a data sequence and uses information based on the recognized data sequence to configure itself to respond to its host process. In a specific embodiment, the desired configuration information is stored in non-volatile storage associated with the host process, such as a magnetic file or a non-volatile random access memory.

15 Claims, 6 Drawing Sheets

METHOD FOR CONFIGURING A COMPUTER BUS ADAPTER CIRCUIT BOARD WITHOUT THE USE OF JUMPERS OR SWITCHES

This is a continuation Ser. No. 07/452,893 filed Dec. 19, 1989, now abandoned.

BACKGROUND OF THE INVENTION

This invention relates to bus mounted peripherals of computer systems such as personal computers and more particularly as to techniques for automatically configuring an adapter circuit card coupled to a bus of a computer system to respond to and with a computer system.

Computer adapter cards must be uniquely addressable across the computer bus for proper interaction between a bus master unit, such as a central processing unit (CPU), and the computer adapter. In a true bus architecture wherein all signal lines are parallel, a means must be provided for designating the unique address or so-called base address of each adapter. To this end, it is conventional to provide switches or jumpers on the adapter card for selecting the base address to which the adapter will respond. Software written to interact with the adapter and which operates on the CPU is instructed to expect an adapter at the base address selected for the adapter. In the past, such software, called drivers has not had the ability to select the configuration for the adapter.

All software drivers employ an initialization sequence which is executed at power-on or during power-on reset which includes information intended to establish communication between the CPU and any peripheral including an adapter. Since adapter cards of conventional design have a pre-selected address, there has been no need to provide instructions to the adapter as to a preferred base address.

There is nevertheless a need to be able to instruct adapters as to a preferred base address for each adapter card coupled to a bus which is independent of switches set on the adapter card.

Several solutions suggested in the past require a different architecture than a true bus, thus requiring a redesign of the bus architecture to eliminate true parallel bus structures. For example, the NuBus bus design promoted by Texas Instruments Incorporated of Dallas Tex. allocates a block of memory and therefore a specific address space for a plurality of potential adapters which can be coupled to the bus. Thus, the potential address space of the NuBus structure must be allocated to a specified number of adapters, which space has been set by design of the bus. As will be apparent, this design departs from the true parallel bus architecture.

Another so-called automatic adapter configuration technique employed in connection with the Micro Channel Architecture (MCA) promoted by IBM Corporation with certain of its personal computers and workstations. In the Micro Channel Architecture, one address line is provided as part of the setup for each slot for use in selecting a designated slot for a specific adapter. Under this scheme, each type of card is serialized and assigned a unique identifying code. The code assigned by IBM is made available to all third party adapter makers. Each card type is thus uniquely identified by slot position and adapter type ID code. In addition to these characteristics, the individual computers must be reconfigured with a set-up procedure each time any adapter card is added, removed or relocated on the bus.

What is needed is a technique for configuring a true parallel computer bus, without the requirement of switches, jumpers or the like and which can be implemented automatically with the driver software intended to cooperate with such adapters.

SUMMARY OF THE INVENTION

According to the invention, a computer bus adapter device which is coupled to a true parallel computer bus is automatically set to a pre-determined configuration in response to configuration data provided to the bus by a host process. During a set-up portion of an initialization procedure, the adapter device recognizes a data sequence and uses information based on the recognized data sequence to configure itself to respond to its host process.

In a specific embodiment, the desired configuration information is stored in non-volatile storage associated with the host process, such as a magnetic file or a non-volatile random access memory.

In a first specific embodiment, both the adapter and the host process may employ an arithmetically generated sequence with a common seed value and a common algorithm. The adapter employs the common seed value and the common algorithm to generate an arithmetic sequence. If the arithmetic sequence is recognized at a particular address, a process of configuration continues until completed or aborted. The process may be aborted by receipt of an incorrect combination of data and address not expected in the arithmetically generated sequence. Multiple attempts may be made at configuration in the event of an aborted configuration process to insure that the adapter is configured properly at the proper base address.

In a second specific embodiment, the host process may transmit a "long" (32 to 5000 bytes) unique data pattern to a desired base address. The adapter, which is monitoring all addresses, recognizes the data sequence. The data sequence uses a base address which is then subsequently used as the base address for the adapter. The long sequence may be a random sequence containing a terminal CRC value which is calculated locally by the adapter for comparison with the long sequence.

The invention will be better understood by reference to the following detailed description in connection with the accompanying drawings.

DESCRIPTION OF SPECIFIC EMBODIMENTS

Figure 1:
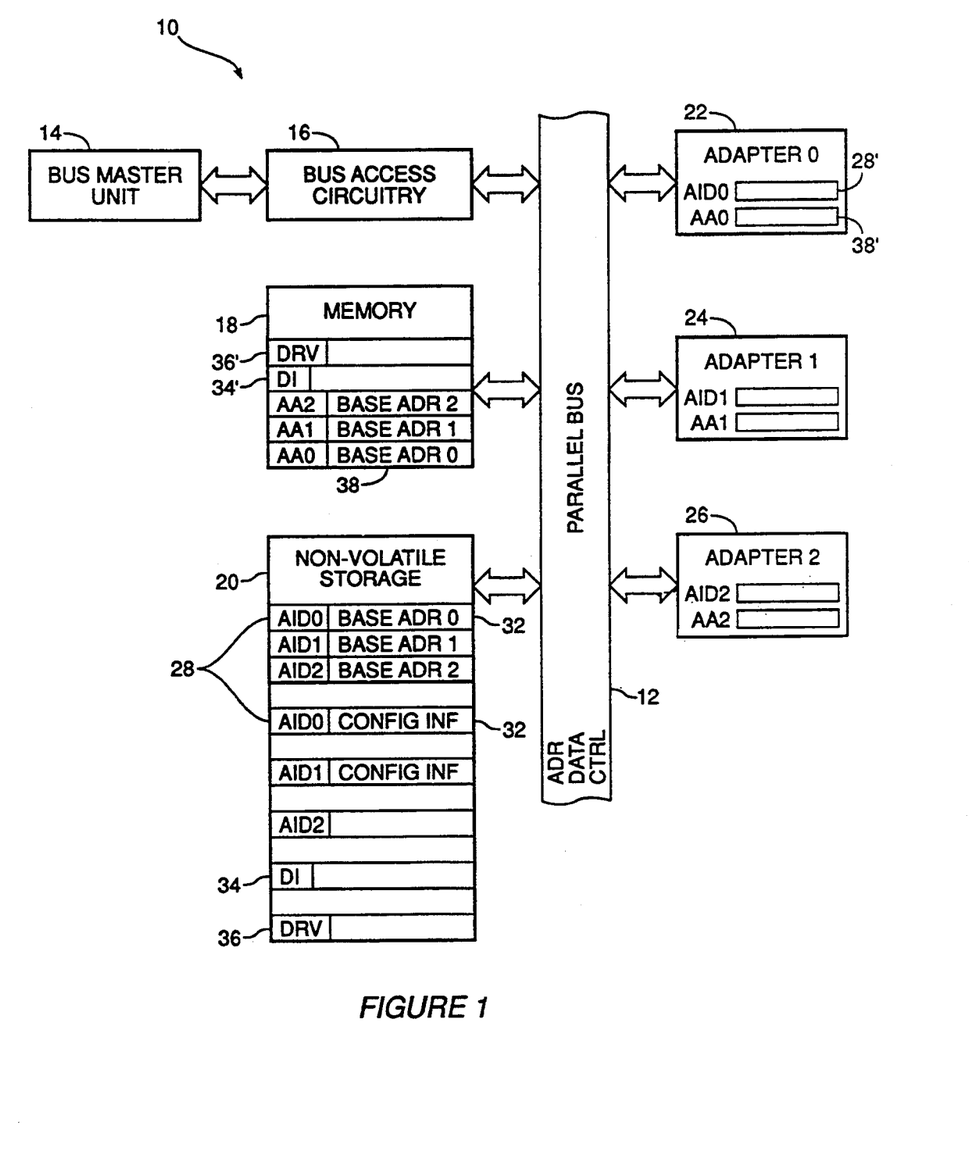
FIG. 1 is a block diagram of a computer system showing a CPU, bus and various adapters in accordance with the invention.

Referring to FIG. 1, there is shown a block diagram of a typical computer system 10 employing a parallel bus 12, the parallel bus 12 carrying address, data and control information on individual lines and being coupled to a plurality of peripherals or adapters at any position or slot on the bus 12. The system 10 includes a bus master unit 14 such as a central processing unit (CPU) which is coupled with bus 12 via bus access circuitry 16. Associated with the bus master unit 14 is digital memory of some form, such as ROM or RAM memory 18, which is coupled with the bus master unit 18 via the parallel bus 12. In addition, in accordance with the invention, non-volatile read/write storage 20 is provided, which may be coupled to the bus master unit 14 via the parallel bus 12. The non-volatile read/write storage is for storing certain address information, configuration information and the like needed for initialization of the system 10, and such information may be changed from time to time.

In accordance with the invention, adapters 22, 24, 26 may be coupled to the parallel bus 12 at any slot or position thereof, and the adapters 22, 24, 26 need not be pre-configured to respond at a particular base address in the memory space or possess a particular identification code. The adapters 22, 24, 26 may include such devices as interfaces for video displays, mass storage devices, input-output devices, supplemental processing units and the like. The non-volatile storage means 20 includes storage for an adapter identification storage location 28, a base address value 30 associated with each adapter identification storage location 28, and configuration information values 32 associated with each adapter identification storage location 28.

In addition, means may be provided for driver initialization, such as a circuit or driver initialization code 34 (which is stored in the non-volatile read/write storage 20), and driver software 36 or equivalent. The driver initialization code 34 and the driver software 36 may be transferred upon power-on or upon power-on reset to the memory 18, to be stored in locations set aside for driver initialization 34' and driver software 36'. The driver initialization means 34' is used to load into the memory 18 base address information 38 for each corresponding adapter address. In a typical computer system, the base address 38 serves as the point of access between the bus master unit 14 and the adapter 22 corresponding to the given base address.

In accordance with the invention, the adapter 22 is provided with means for receiving over the parallel bus 12 its particular adapter identification 28' and its adapter address or base address 38'. Means may be provided for the bus master unit 14 and each adapter 22, 24, 26 for setting the adapters for unique addressing by the bus master unit 14.

In accordance with the invention, the method for configuring the computer bus adapters 22, 24, 26 comprises the steps of retrieving through the bus master unit 14 initialization information and configuration values from the nonvolatile storage 20, preparing by means of the bus master unit 14 a first sequence of information based on the initialization information for transmittal to the adapters 22, 24, 26, the specific first sequence of information being uniquely associated with a particular adapter. Thereafter, the first sequence of information is sent from the bus master unit 14 to the adapters, 22, 24, 26 via the bus 12, each of which are either monitoring the entire address space or monitoring a particular address for recognizable information. The adapter 22 receives information and monitors for the first sequence of information until it is recognized. Upon recognition, the adapter 22 uses the first sequence of information to establish a base address in the system memory (or input/output memory) space for the adapter 22, and also for establishing an identity for the adapter. The base address is used for uniquely addressing the adapter 22 by the bus master unit 14 for future operations of the system 10. Thereafter, initial configuration information is transmitted as configuration values in some form from the bus master unit 14 to the adapter 22 corresponding to the specified base address. The adapter is thereupon ready for use by the system.

In accordance with the invention, two different types of recognition protocols may be implemented. In a first protocol, an arithmetic sequence is computed by the bus master unit 14 in accordance with the pre-established procedure, the adapter 22 computes the arithmetic sequence using the same feature, and the results are compared to determine whether there is a match between the two computed sequences.

In the second procedure, a random sequence and a sequence check value are computed and transmitted to the adapter 22 by the bus master unit 14, and the adapter 22 receives the random or pseudo-random data and calculates the check value locally which is then compared with the transmitted check value to determine if there is a match for a particular identification code.

Figure 2:
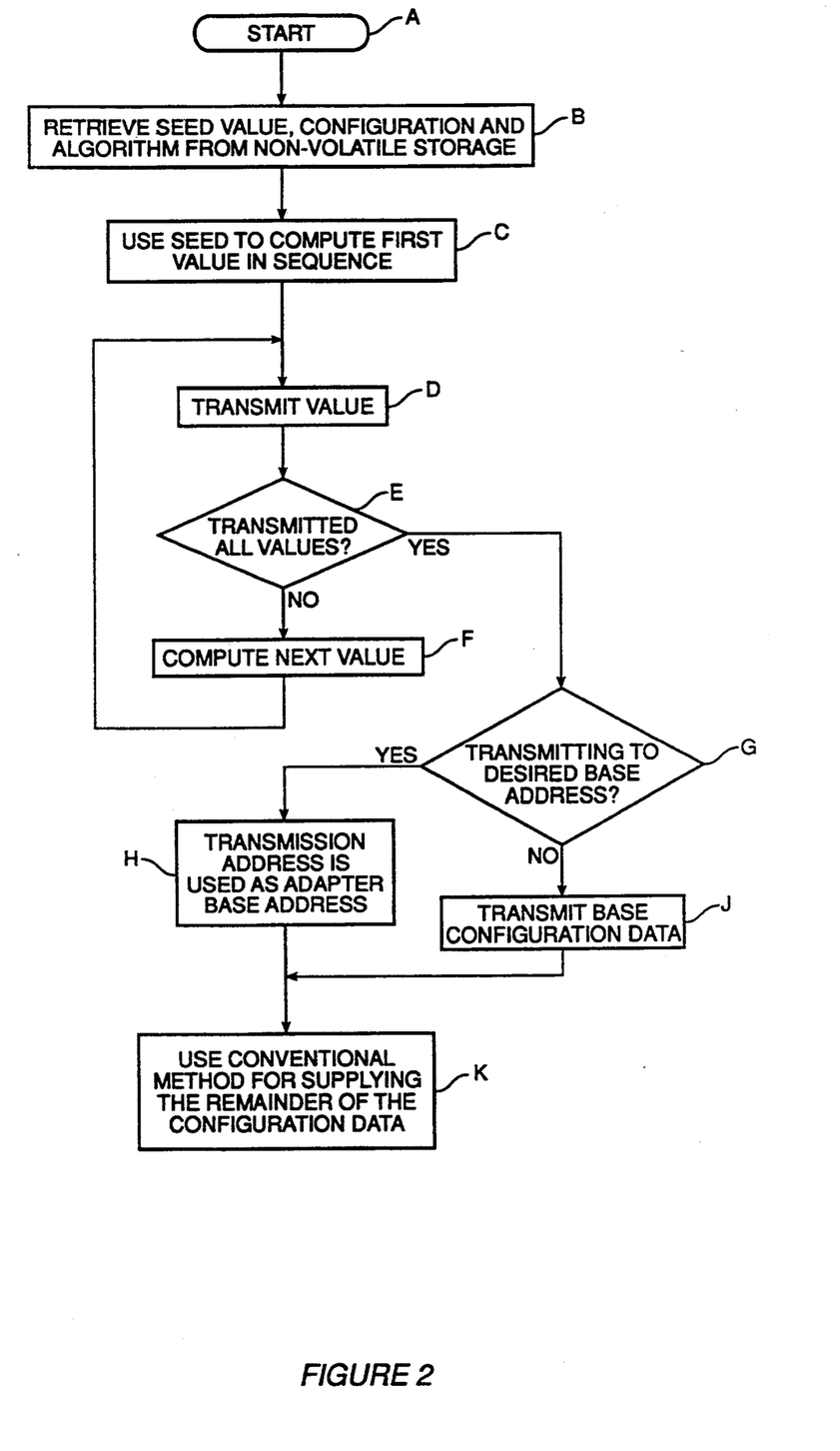
FIG. 2 is a flow chart for a driver initialization code sequence for a first embodiment of the invention.
Figure 3:
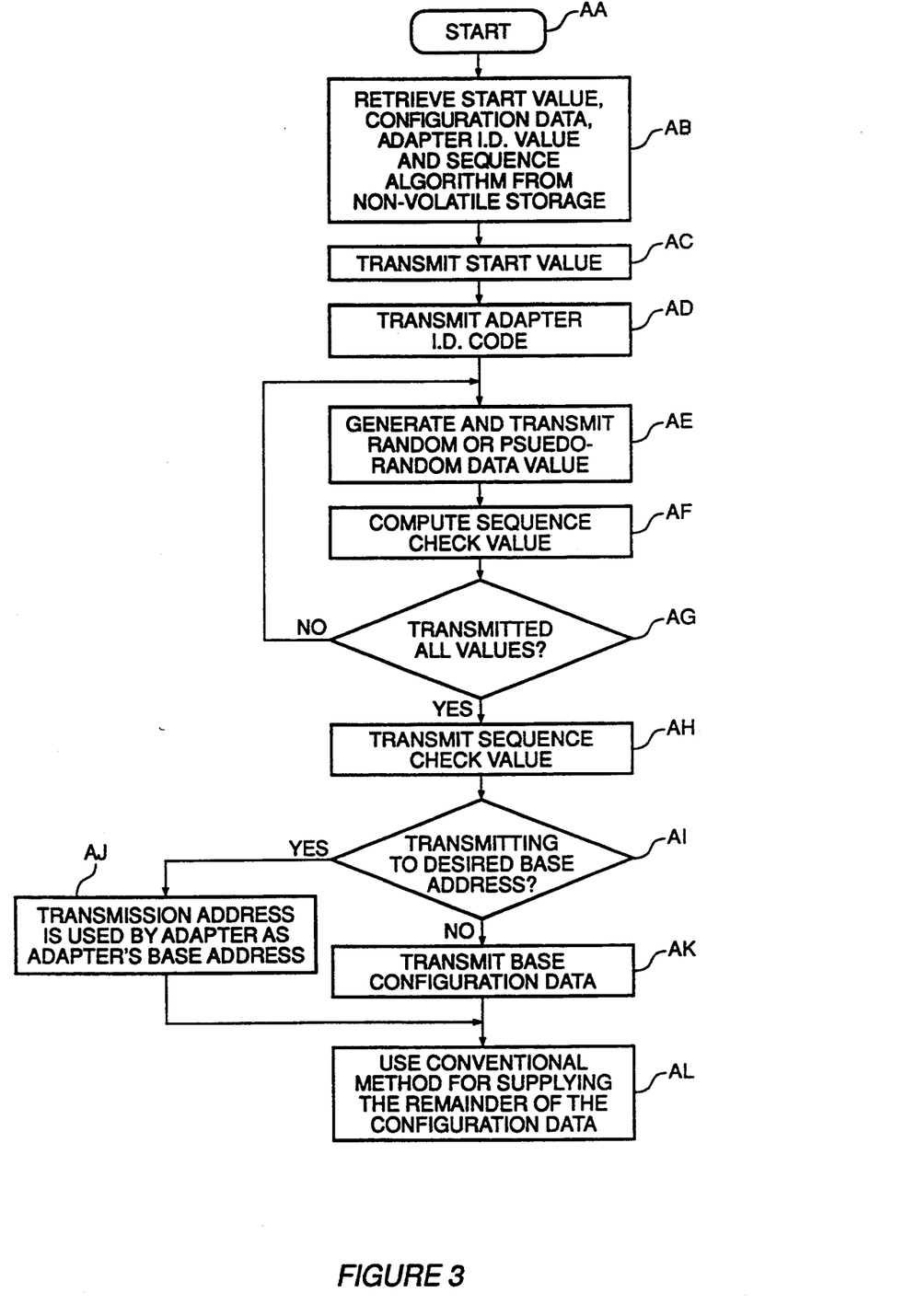
FIG. 3 is a flow chart for a driver initialization code sequence for a second embodiment of the invention.
Figure 4:
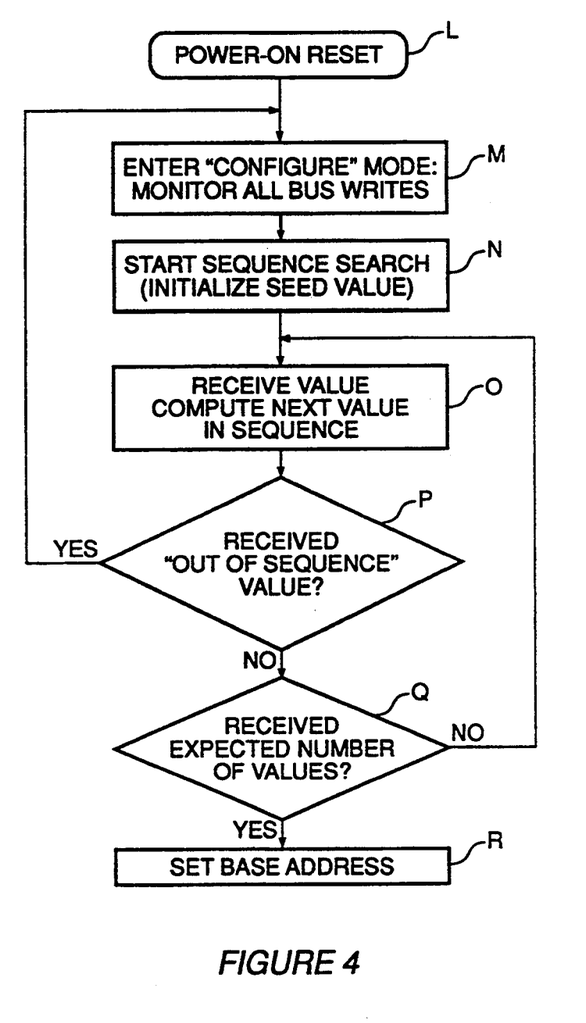
FIG. 4 is a flow chart of an adapter configuration sequence for the first embodiment of the invention.
Figure 5:
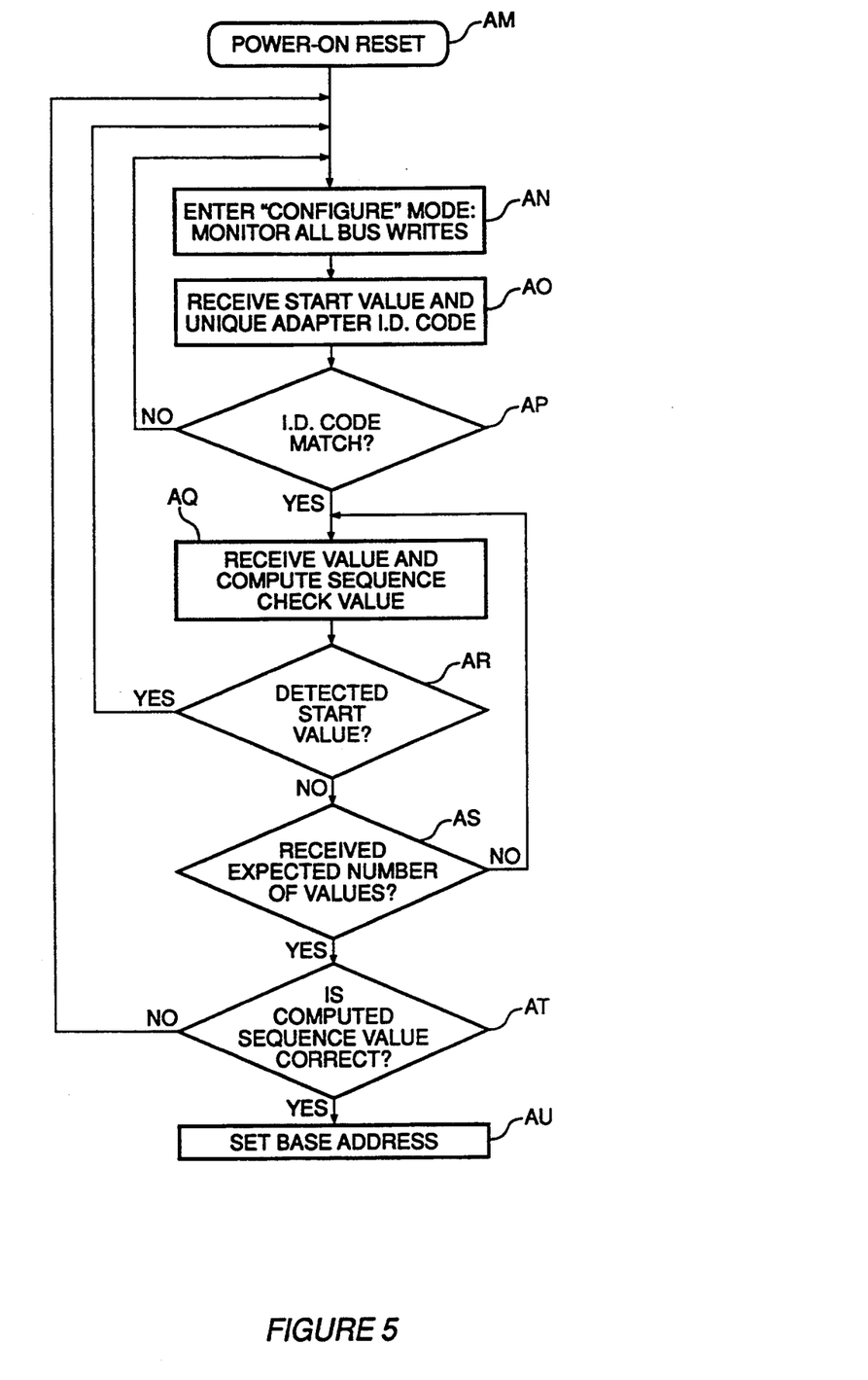
FIG. 5 is a flow chart for an adapter configuration sequence for a second embodiment.
Figure 6:
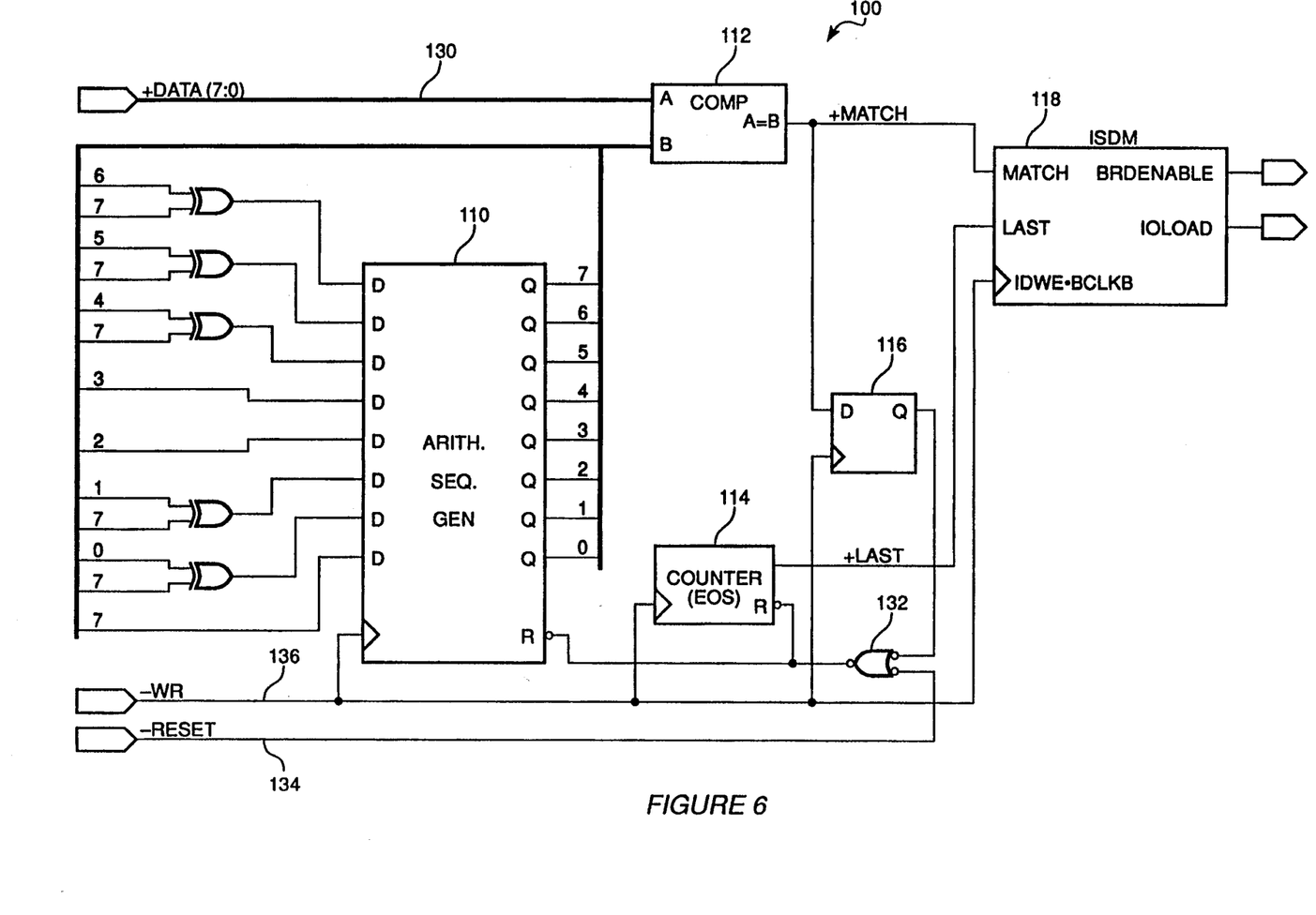
FIG. 6 is a block diagram of an adapter pattern matching circuit for the first embodiment of the invention representing a hardware implementation of the flow chart of FIG. 4.

FIGS. 2 and 4 illustrate procedures involved in an arithmetic sequence-based protocol in accordance with the invention, and FIGS. 3 and 5 illustrate random sequence protocol in accordance with the invention. FIG. 6 is a schematic diagram of a specific circuit implementation of an arithmetic sequence-based protocol in accordance with the invention. The state machine for the apparatus in FIG. 6 is illustrated by source codes in machine language form hereinafter.

Referring to FIG. 2, the arithmetic sequence form of the invention is illustrated. Upon power on reset (Step A), the bus master unit 14 retrieves from nonvolatile storage 20 a seed value, configuration information and the arithmetic sequence algorithm to working memory 18 (Step B). Thereafter the bus master unit 14 uses the seed value to compute the first value in the arithmetic sequence (Step C). It then transmits the value to the bus 12 (Step D), assuming that there are adapters monitoring, and tests by counting for the transmission of all values (Step E). If the sequence is incomplete, the next value is computed (Step F) and transmitted (Step E). The bus master unit 14 thereafter tests whether the values were transmitted to the desired base address (Step G). If Yes, then the transmission address is used as the adapter base address, and no other base address information need be transmitted by the bus master unit 14 (Step H). If no, then the bus master unit 14 is understood to be transmitting to a preselected address and therefore the desired base address configuration for the adapter is appended to the arithmetic data sequence which is then transmitted (Step J). In either case, once the base address has been identified to the adapter 22, conventional methods are then used for supplying the remainder of the configuration data (Step K).

Referring to FIG. 4, there is shown a flow chart of the operation of the adapter 22 in response to the arithmetic sequence protocol of FIG. 2. After power on reset (Step L), the adapter 22 enters the "configure"

mode and monitors all bus writes, i.e., all information written by the bus master unit 14 to the bus 12 (Step M). The seed value for the type of adapter and which is hard wired into the adapter, is used to start the search for the particular arithmetic sequence generated by the bus master unit 14 using the predefined algorithm (Step N). The adapter 22 receives a value from the bus 12 synchronously with the computation of the sequence by the bus master unit and computes the next value from the previous value using the same algorithm (Step O). Comparing data values on the bus 12, the adapter 22 tests for the expected next value (Step P). If the next received value is not as computed, then the adapter 22 restarts the configuration cycle (Step M). If the test is successfully passed, then the adapter 22 tests for reception of the expected number of in-sequence values at the same address (Step Q). If the test fails, then the adapter continues receiving (Step O). When the test passes, the adapter sets the base address by using either the address used by the received sequence as the adapter base address or the final elements of the sequence as the adapter base address, depending upon the specific implementation (Step R).

FIG. 3 illustrates an alternative protocol for use by the bus master unit 14. Upon power on reset (Step AA), the bus master unit 14 retrieves from nonvolatile storage 20 a start value, an adapter identification value, configuration information and a pseudo-random arithmetic sequence algorithm to working memory 18 (Step AB). Thereafter the bus master unit 14 transmits the start value (Step AC) and the adapter id value (Step AD) to the bus 12, assuming that there are adapters monitoring. The bus master unit 14 then generates and transmits the random or pseudo-random data value to the bus 12 (excluding specifically the start value) (Step AE) and then computes a sequence check value on each byte based on the history (such as a Cyclic Redundancy Check or CRC) (Step AF). The bus master unit 14 then tests by counting for the transmission of all values (Step AG) and continues the generation sequence (Step AE) if not complete. The bus master unit then sends the sequence check value (Step AH), and thereafter tests whether the values were transmitted to the desired base address (Step AI). If Yes, then the transmission address is used as the adapter base address, and no other base address information need be transmitted by the bus master unit 14 (Step AJ). If no, then the bus master unit 14 is understood to be transmitting to a preselected address, and therefore the desired base address configuration for the adapter is appended to the arithmetic data sequence which is then transmitted (Step AK). In either case, once the base address has been identified to the adapter 22, conventional methods are then used for supplying the remainder of the configuration data (Step AL).

FIG. 5 is a flow chart of the operation of the adapter 22 in response to the pseudo-random sequence protocol of FIG. 3. After power on reset (Step AM), the adapter 22 enters the "configure" mode and monitors all bus writes, i.e., all information written by the bus master unit 14 to the bus 12 (Step AN). The start value, which may be universal or specific for the type of adapter and which is hard wired into the adapter, is used to start the search for the sequence generated by the bus master unit 14 following the start code. The adapter 22 receives a start value and an identification value from the bus 12 (Step AO). The adapter 22 tests for recognition of its adapter identification value (Step AP) until it is found. Otherwise, it restarts the configuration cycle (Step AN). Once the identification value has been found following a start value, the adapter 22 starts the sequence search by receiving the random value and computing the sequence check value (CRC) (Step AQ). If the start value is received (Step AR), then the adapter 22 restarts the configuration cycle (Step AN). If the test is successfully passed, then the adapter 22 tests for reception of the expected number of values at the same address (Step AS). If the test fails, then the adapter continues receiving (Step AQ). When the test passes, the adapter compares its own computed sequence check value with the received check value (Step AT). If there is no match, the configuration cycle is restarted (Step AN). If there is a match, the adapter 22 sets the base address by using either the address used by the received sequence as the adapter base address or the final elements of the sequence as the adapter base address, depending upon the specific implementation (Step AU).

FIG. 6 illustrates an adapter pattern matching circuit 100 for the first embodiment of the invention representing a hardware implementation of the flow chart of FIG. 4. A similar type of circuit could be used for the implementation in accordance with the procedure illustrated in FIG. 5. The circuit 100 comprises an arithmetic sequence generator (ASG) 110, a comparison circuit 112, an end of sequence counter 114, a single bit latch 116, an identification state machine (IDSM) 118 and a plurality of gates 120, 122, 124, 126, 128 defining an arithmetic sequence algorithm. Data lines 130 from the bus 12 are coupled to the "A" inputs of the comparison means 112. The arithmetic sequence generator 110 includes data inputs D for receiving outputs from the gates and data outputs Q coupled to the "B" inputs of the comparison means 112 and fed back directly and through the gates to the data inputs D for providing data for comparison means 112 and for generating values in accordance with the preselected arithmetic sequence.

The ASG 110 is a bank of latches. The gates are for example dual-input XOR gates having as one input a common bit and as the other input the next lower order bit of the feedback data. The latches are initialed by reset through an AND gate 132 coupled to receive the output of the latch 116 and a reset signal on line 134 from the bus 12. A write signal on line 136 provides a clock to the ASG 110, the counter 114, the latch 116 and the IDSM 118. The counter provides a signal indicating receipt of the last byte in sequence to the IDSM 118. The comparison means 112 indicates a byte by byte match between the arithmetic sequence (at "B") and received data (at "A"), and any mismatch causes a restart through latch 116. The IDSM 118 is responsive to the match of the comparison means 112, the clock signal on line 134 and the "last" signal from counter 114 to enable the adapter (BRDENABLE) and to load the input/output base address (IOLOAD). It is a simple state machine implementation of logic which upon assertion of "match" and "last" receives and passes on a sequence identifying the base address (through IOLOAD) and enables the adapter by asserting BRDENABLE. Attached as Appendix A is the source code for a suitable ID Sequence State Machine 118.

Other circuits may be implemented in accordance with the invention without departing from the underlying concept of configuring an adapter without the need for jumpers or specially designed bus connections.

The invention has now been described with reference to specific embodiments. Other embodiments will be apparent to those of ordinary skill in the art. It is therefore not intended that this invention be limited, except as indicated in the appended claims.

---

APPENDIX A

CHIP    IDSM    LCA

```
;Description : ID SEQUENCE STATE MACHINE
;Input pins
bclkb       ; bus clock
idwe        ; ID sequencer write enable
last        ; ID sequence in first state (OxFF)
match       ; ID sequence state equals write data
;Output pins
brdenable   ; Board IO enable
ioload      ; IO base address load enable
s0          ; state bit 0
s1          ; state bit 1
;CUPL program
;
;FIELD statebits = [s1..0];
;$define wait    'h'0
;$define cnt1    'h'1
;$define cnt2    'h'3
;$define done    'h'2
;
;SEQUENCE statebits {
;PRESENT wait
;              if last & match NEXT cnt1;
;              DEFAULT NEXT wait;
;PRESENT cnt1
;              if !last & match NEXT cnt1;
;              if  last & match NEXT cnt2;
;              if last & !match NEXT done;
;              DEFAULT NEXT wait;
;PRESENT cnt2
;              if !last & match NEXT cnt2;
;              if  last OUT ioload;
;              if  last NEXT done;
;              DEFAULT NEXT wait;
;PRESENT done
;              OUT brdenable;
;              NEXT done;
;}
EQUATIONS
ioload   = last * s0 * s1
brdenable = /s0 * s1
s0       := last * match * /s1
         + /last * match * s0
s0.clkf  = bclkb
s0.ce    = idwe
s1       := /s0 * s1
         + last * s0
         + /last * match * s0 * s1
s1.clkf  = bclkb
s1.ce    = idwe
```

---

What is claimed is:

1. A method for configuring a computer bus adapter in a computer system having a parallel bus, a bus master unit, nonvolatile storage means, and a plurality of adapter means, including said bus adapter, coupled to any slot on said parallel bus, said bus master unit including a processor said method performed by hardware and software in the computer system where the parallel bus provides the only data connection between said bus master unit and said adapter means, said method comprising the steps of:

retrieving, by means of the processor in the bus master unit, initialization information and configuration values for said bus adapter from said nonvolatile storage means to said bus master unit;

preparing, by means of the processor in the bus master unit, a first information code sequence from said initialization information for use by said bus adapter;

broadcasting, by means of the processor in the bus master unit, said first information code sequence from said bus master unit to all of said plurality of adapter means via said parallel bus;

monitoring information from said parallel bus at said plurality of adapter means including said bus adapter before an address has been determined for said bus adapter;

recognizing said first information code sequence by said bus adapter before an address has been determined for said bus adapter, and upon recognizing said first information code sequence by said bus adapter, indicating recognition to said bus master unit; and using said first information code sequence in said bus master unit to establish a base address for said bus adapter, said base address for uniquely addressing said bus adapter by said bus master unit via said parallel bus.

2. The method according to claim 1, further including the step of:

transmitting, by means of the bus master unit, said configuration values from said bus master unit to said bus adapter by reference to said base address.

3. A method for configuring a computer bus adapter in a computer system having a parallel bus, a bus master unit, nonvolatile storage means, and a plurality of adapter means, including said bus adapter, coupled to any slot on said parallel bus, said bus master unit including a processor said method performed by hardware and software in the computer system where the parallel bus provides the only data connection between said bus master unit and said adapter means, said method comprising the steps of:

retrieving, by means of the processor in the bus master unit, initialization information and configuration values for said Bus adapter from said nonvolatile storage means to said bus master unit, said initialization information including a seed value for an identification process and a procedure for an identification process;

preparing, by means of the processor in the bus master unit, a first information code sequence from said initialization information, said preparing step comprising executing said identification process according to said procedure based upon said seed value;

broadcasting, by means of the processor in the bus master unit, said first information code sequence from said bus master unit to all of said plurality of adapter means via said parallel bus, wherein said first information code sequence includes a plurality of values derived from said seed value;

monitoring information from said parallel bus at said plurality of adapter means including said bus adapter before an address has been determined for said bus adapter;

recognizing said first information code sequence by said bus adapter before an address has been determined for said bus adapter, and upon recognizing said first information code sequence by said bus adapter, indicating recognition to said bus master unit; and using said first information code sequence to establish a base address for said bus adapter, said base address for uniquely addressing said bus adapter by said bus master unit via said parallel bus.

4. The method according to claim 3 wherein said using step comprises employing in said bus master unit a portion of said first information code word as a base address value for said bus adapter.

5. The method according to claim 3 wherein said using step comprises employing as a base address value in said bus master unit for said bus adapter the address to which said first sequence is transmitted.

6. The method according to claim 3, further including the step of:

transmitting, by means of the bus master unit via said parallel bus, said configuration values from said bus master unit to said bus adapter by reference to said base address.

7. A method for configuring a computer bus adapter in a computer system having a parallel bus, a bus master unit, nonvolatile storage means, and a plurality of adapter means, including said bus adapter, coupled to any connection position on said parallel bus, said bus master unit including a processor, said method performed by hardware and software in the computer system, said method comprising the steps of:

retrieving, by means of the processor in the bus master unit, initialization information and configuration values for said bus adapter from said nonvolatile storage means to said bus master unit, said initialization information including a start value and unique adapter identification code;

preparing, by means of the processor in the bus master unit, a first information code sequence from said initialization information, said preparing step comprising computing an identification sequence and computing a check value for said identification sequence;

broadcasting, by means of the processor in the bus master unit, said first information code sequence from said bus master unit to all of said plurality of adapter means via said parallel bus before an address has been determined for said bus adapter, wherein said first information code sequence includes said identification sequence and said check value;

monitoring information from said parallel bus at said bus adapter before an address has been determined for said bus adapter, said monitoring step comprising receiving said identification sequence and said check value, computing a verification value for said identification sequence, and comparing said verification value with said check value for a match;

recognizing said first information code sequence by said bus adapter before an address has been determined for said bus adapter, and upon recognizing said first information code sequence by said bus adapter, indicating recognition to said bus master unit; and using, by means of said bus master unit, said first information code sequence in said bus master unit to establish a base address for said bus adapter, said base address for uniquely addressing said bus adapter by said bus master unit via said parallel bus.

8. The method according to claim 7 wherein said using step comprises employing in said bus master unit a portion of said first code word as a base address value for said bus adapter.

9. The method according to claim 7 wherein said using step comprises employing in said bus master unit as a base address value for said bus adapter the address to which said first information code word is transmitted.

10. The method according to claim 7, further including the step of:

transmitting, by means of the bus master unit, said configuration values from said bus master unit to said bus adapter by reference to said base address.

11. A method for configuring a computer bus adapter in a computer system having a parallel bus, a bus master unit, nonvolatile storage means, and a plurality of adapter means, including said bus adapter, coupled to any slot on said parallel bus, said bus master unit including a processor said method performed by hardware and software in the computer system and said method not requiring any data connection between said bus master unit and said adapter means other than said parallel bus, said method comprising the steps of:

retrieving, by means of the processor in the bus master unit, initialization information and configuration values for said bus adapter from said nonvolatile storage means to said bus master unit;

preparing, by means of the processor in the bus master unit, a first information code sequence from said initialization information for use by said bus adapter;

broadcasting, by means of the processor in the bus master unit, said first information code sequence from said bus master unit to all of said plurality of adapter means via said parallel bus;

monitoring information from said parallel bus at said plurality of adapter means including said bus adapter;

recognizing said first information code sequence by said bus adapter, and upon recognizing said first information code sequence by said bus adapter, indicating recognition to said bus master unit; and using said first information code sequence in said bus master unit to establish a base address for said bus adapter, said base address for uniquely addressing said bus adapter by said bus master unit via said parallel bus.

12. A method for configuring a computer bus adapter in a computer system having a parallel bus with a plurality of lines for data and a separate plurality of lines for address information, a bus master unit, nonvolatile storage means, and a plurality of adapter means, including said bus adapter, coupled to any connection position on said parallel bus, where the parallel bus provides the only data connection between said bus master unit and said adapter means, comprising the steps of:

retrieving, by means of a processor in the bus master unit, initialization configuration data for said bus adapter from said nonvolatile storage means to said bus master unit;

preparing, by means of a processor in the bus master unit, a configuration data sequence for said bus adapter using said initialization configuration data, said bus adapter being capable of recognizing said configuration data sequence;

broadcasting, by means of the processor in the bus master unit, said configuration data sequence on said data lines of said parallel bus while asserting a desired address on said address lines of said parallel bus;

monitoring information from said data lines of said parallel bus by said plurality of adapter means; and recognizing said configuration data sequence on said data lines of said parallel bus by said bus adapter, and upon recognizing said configuration data sequence by said bus adapter, indicating recognition to said bus master unit and using said desired address on said address lines to establish a base address for said bus adapter, said base address for uniquely addressing said bus adapter by said bus master unit via said parallel bus.

13. The method according to claim 12, wherein said initialization configuration data includes a seed value for an identification process and a procedure for an identification process and wherein said configuration data sequence is prepared from said seed value using said process.

14. A method for configuring a computer bus adapter in a computer system having a parallel bus with a plurality of lines for data and a separate plurality of lines for address information, a bus master unit, nonvolatile storage means, and a plurality of adapter means, including said bus adapter, coupled to any connection position on said parallel bus, where the parallel bus provides the only data connection between said bus master unit and said adapter means, comprising the steps of:

retrieving, by means of a processor in the bus master unit, initialization configuration data for said bus adapter from said nonvolatile storage means to said bus master unit;

preparing, by means of a processor in the bus master unit, a configuration data sequence for said bus adapter using said initialization configuration data;

broadcasting, by means of the processor in the bus master unit, said configuration data sequence on said data lines of said parallel bus;

monitoring information from said data lines of said parallel bus by said plurality of adapter means; and recognizing said configuration data sequence on said data lines of said parallel bus by said bus adapter, and upon recognizing said configuration data sequence by said bus adapter, indicating recognition to said bus master unit and using information from said configuration data sequence to establish a base address for said bus adapter, said base address for uniquely addressing said bus adapter by said bus master unit via said parallel bus.

15. The method according to claim 14, wherein said initialization configuration data includes a seed value for an identification process and a procedure for an identification process and wherein said configuration data sequence is prepared from said seed value using said process.

* * * * *